Dec. 26, 1950 D. D. GRIEG 2,535,061

ELECTRICAL PULSE WIDTH SHAPER AND SELECTOR

Filed Aug. 19, 1944 8 Sheets-Sheet 1

INVENTOR.
DONALD D. GRIEG

BY Percy P. Lantzy

ATTORNEY

Dec. 26, 1950 D. D. GRIEG 2,535,061

ELECTRICAL PULSE WIDTH SHAPER AND SELECTOR

Filed Aug. 19, 1944 8 Sheets-Sheet 2

INVENTOR.
DONALD D. GRIEG
BY Percy P. Lantzy
ATTORNEY

Dec. 26, 1950 D. D. GRIEG 2,535,061

ELECTRICAL PULSE WIDTH SHAPER AND SELECTOR

Filed Aug. 19, 1944 8 Sheets-Sheet 3

INVENTOR.
DONALD D. GRIEG

BY Percy P. Lantzy

ATTORNEY

Dec. 26, 1950 D. D. GRIEG 2,535,061

ELECTRICAL PULSE WIDTH SHAPER AND SELECTOR

Filed Aug. 19, 1944 8 Sheets-Sheet 4

INVENTOR.
DONALD D. GRIEG

BY Percy P. Lantzy

ATTORNEY

ELECTRICAL PULSE WIDTH SHAPER AND SELECTOR

INVENTOR.
DONALD D. GRIEG
BY Percy P. Lantzy
ATTORNEY

Dec. 26, 1950 D. D. GRIEG 2,535,061

ELECTRICAL PULSE WIDTH SHAPER AND SELECTOR

Filed Aug. 19, 1944 8 Sheets-Sheet 6

INVENTOR.
DONALD D. GRIEG

BY Percy P. Lantzy

ATTORNEY

Dec. 26, 1950 D. D. GRIEG 2,535,061

ELECTRICAL PULSE WIDTH SHAPER AND SELECTOR

Filed Aug. 19, 1944 8 Sheets-Sheet 7

INVENTOR.
DONALD D. GRIEG
BY Percy P. Lantzy
ATTORNEY

ELECTRICAL PULSE WIDTH SHAPER AND SELECTOR

Filed Aug. 19, 1944 8 Sheets-Sheet 8

INVENTOR.
DONALD D. GRIEG
BY Percy P. Lantzy
ATTORNEY

Patented Dec. 26, 1950 2,535,061

UNITED STATES PATENT OFFICE 2,535,061

ELECTRICAL PULSE WIDTH SHAPER AND SELECTOR

Donald D. Grieg, Forest Hills, N. Y., assignor to Federal Telephone and Radio Corporation, New York, N. Y., a corporation of Delaware Application August 19, 1944, Serial No. 550,183

13 Claims. (Cl. 250—27)

This invention relates to electrical systems and particularly to signaling and control systems such as those adapted to utilize pulses.

An object of the present invention is the provision of a single means, common to a transmitter and a receiver, for shaping the pulses to be transmitted to a desired width, and for selecting from received pulses those having said desired width.

A further object of the present invention is the provision of a pulse-width selector which without requiring any tuning will receive pulses of any width, but which when pulses of more than one width are being received operates to select only those pulses nearest the desired width. It thus becomes possible to merely turn on the receiver in order to ascertain if any pulses are being transmitted. If pulses of more than one width within predetermined limits are being transmitted, the receiver will select those of the width nearest the width for which the receiver is tuned and reject the others. Any of the other pulse widths may be selectively received by tuning the receiver to the width of the desired pulses.

Another object of this invention is the provision of an improved shaper circuit for reshaping pulses of a given width into pulses of a selected width less than said given width.

Another object of the present invention is the provision of an improved combination of a transmitter for shaping pulses to a given width and modulating said pulses with intelligence, and a receiver for selecting pulses of a desired width and demodulating said pulses to derive the intelligence represented by said modulation.

Another object of the present invention is the provision of a combination as stated hereinabove in which the pulses are time modulated with intelligence.

Another object of the present invention is the provision of a combination, as stated hereinabove, in which the pulses are frequency modulated with intelligence.

Another object of the present invention is the provision of a combination, as stated hereinabove, in which the pulses are amplitude modulated with intelligence.

Other and further objects of the present invention will become apparent and the foregoing will be best understood from the following description of embodiments thereof, reference being had to the drawings, in which.

Figure 1:
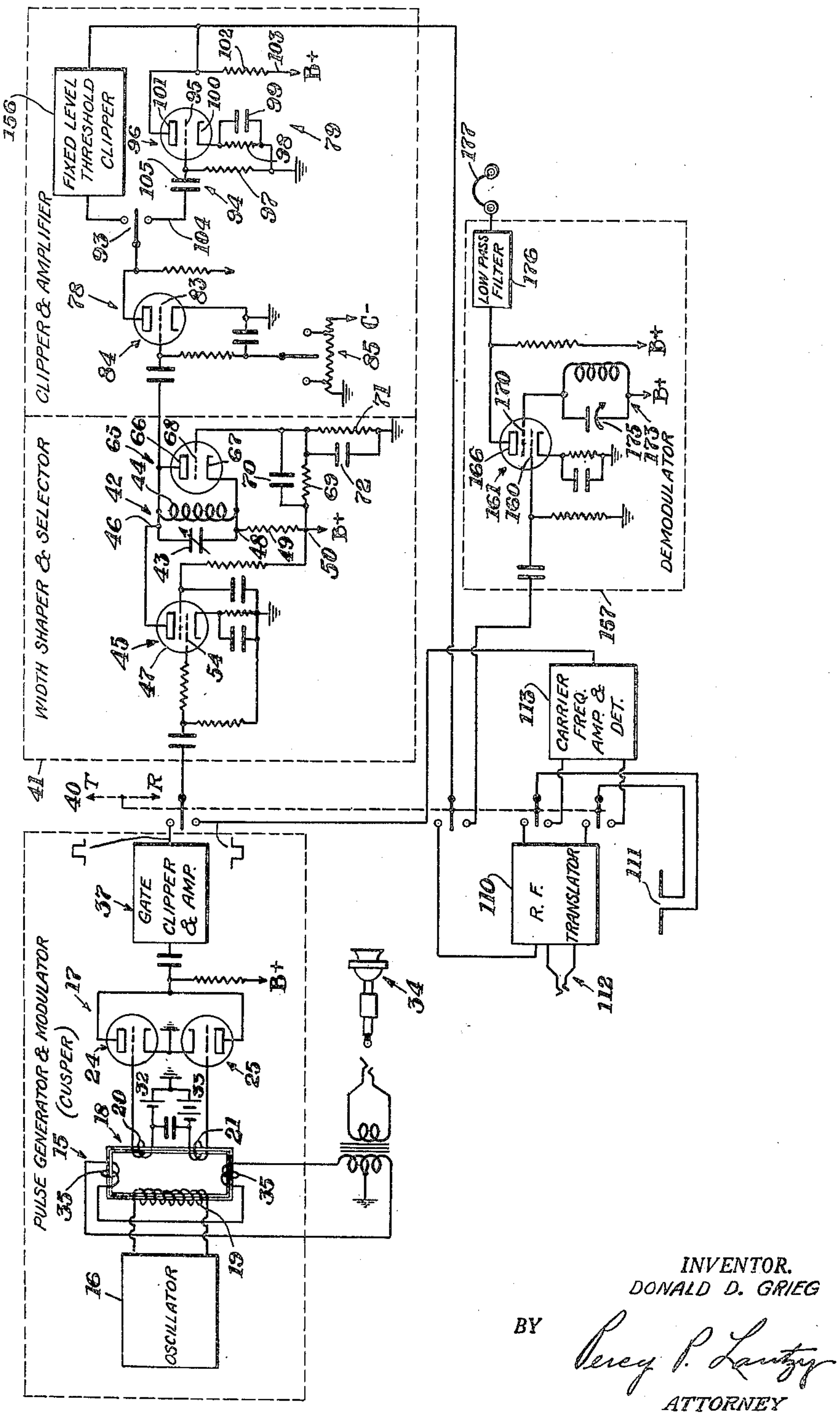
Fig. 1 is a schematic diagram of a time modulated pulse communication system embodying this invention.

It is to be understood that the curves shown in the drawings are not intended to have an exact quantitative significance, and are only intended to have meaning to the extent brought out by the description.

According to this invention a single means, or circuit, is provided serving the dual function of shaping the pulses to be transmitted to a desired width and simultaneously selecting received pulses of or nearest said desired width. Said means or circuit may be employed with various types of pulse modulation. The modulation, for example, may be one of several forms of P. T. M. (pulse time modulation), or it may be P. F. M. (pulse frequency modulation), or P. A. M. (pulse amplitude modulation) or any combination of the different types of modulation so long as one does not interfere with another.

By different forms of P. T. M. modulation, reference is made to "single" pulse time modulation with respect to a given time position or some pulse or pulses fixed in time position, and various forms of "double" pulse time modulation such as where the successive pulses of a given channel are time displaced from normal time positions in "push-pull" manner toward and away from each other.

In Fig. 1 there is illustrated a "double" pulse time modulated system embodying this invention, wherein pulses are generated, time modulated with intelligence, and passed through the width shaper and selector circuit of my invention to shape the pulses to a desired width. These pulses are then delivered to a receiver by any suitable means, such as for example by means of a radio link or by line transmission.

In the receiver, the received pulses are detected so as to remove the carrier frequency if a radio link is employed, and are then applied to the width shaper and selector circuit which selects the desired pulses and transmits them to a demodulator. The demodulator translates the time modulation of these pulses into amplitude variations and these amplitude variations are impressed upon a suitable utilization device such as for example a speaker system.

Pulses may be generated and time molulated in any suitable manner. One preferred type of pulse generator and modulator is described in the copending application of Emile Labin and myself, Serial No. 455,897, filed August 24, 1942, for "Push Pull Modulation System," since issued as U. S. Patent No. 2,416,329. One form of pulse generator and modulator there described and designated herein in Fig. 1 by the numeral 15, includes an oscillator 16 for producing preferably sinusoidal oscillations 22 as illustrated in curve *a*, Fig. 3. The sine wave 22 may have a frequency equal to one half the repetition frequency of the pulses to be generated. The sine wave 22 is then fed through a cusper circuit 17 which serves to translate it into pulses and at the same time provides for time modulation of the pulses.

The cusper 17 includes a transformer 18 having a primary 19 connected to the output of oscillator 16. The transformer 18 has two secondary coils 20 and 21 coupled to the control grids of two vacuum tubes 24 and 25 respectively in push-pull arrangement similar to a full wave rectifier. The cusper amplifies and, in effect, full wave rectifies the sine wave 22 of curve *a*, Fig. 3, to obtain a cusper wave 29, curve *b*, Fig. 3.

The modulation of the cusper wave is produced by applying the signal intelligence derived from a source 34 to primary coils 35 on transformer 18. While rectification of these waves may be symmetrical relative to zero axis 26, it is shown for purposes of illustration as being offset by different biasing potentials 32 and 33. This gives the effect of an offset axis 28 about which modulation takes place. The signal intelligence operates, in effect, to vary the sine wave 22 of curve *a* relative to its offset axis 28 as regards the full wave rectification. This relative variation between the wave and the zero axis thereof is illustrated in curve *a* of Fig. 3 by the upper and lower modulation limits 26 and 30. When the input signal varies the relative relation between the offset axis 28 and the sine wave as indicated by limit 30, the cusper wave, for example, is displaced as shown by the broken line 31, and when varied to the opposite limit 26, it is displaced as shown by line 27, curve *b*, Fig. 3. It will be observed that the signal wave thus varies the time positions of the cusps in push-pull manner toward and away from each other thereby decreasing or increasing the time interval between successive cusps.

The output of tubes 24 and 25 is fed to a gate clipper and amplifier 37. The clipper of device 37 may be of any well-known form, such as a double diode clipper, that clips the cusps between levels 38 and 39, curve *b*, Fig. 3, to thereby produce base pulses which when amplified appear as shown in curve *c*. Of course, it is to be understood that by adjusting the gate clipper, the limit levels may be varied so as to obtain a base pulse of a lesser or greater width. It is preferred that the width of the base pulse thus produced be greater than any pulse width which is to be transmitted.

The output of the device 37 may then be fed through a multiple-type switch 40, to a width shaper and selector circuit 41.

Figure 3:
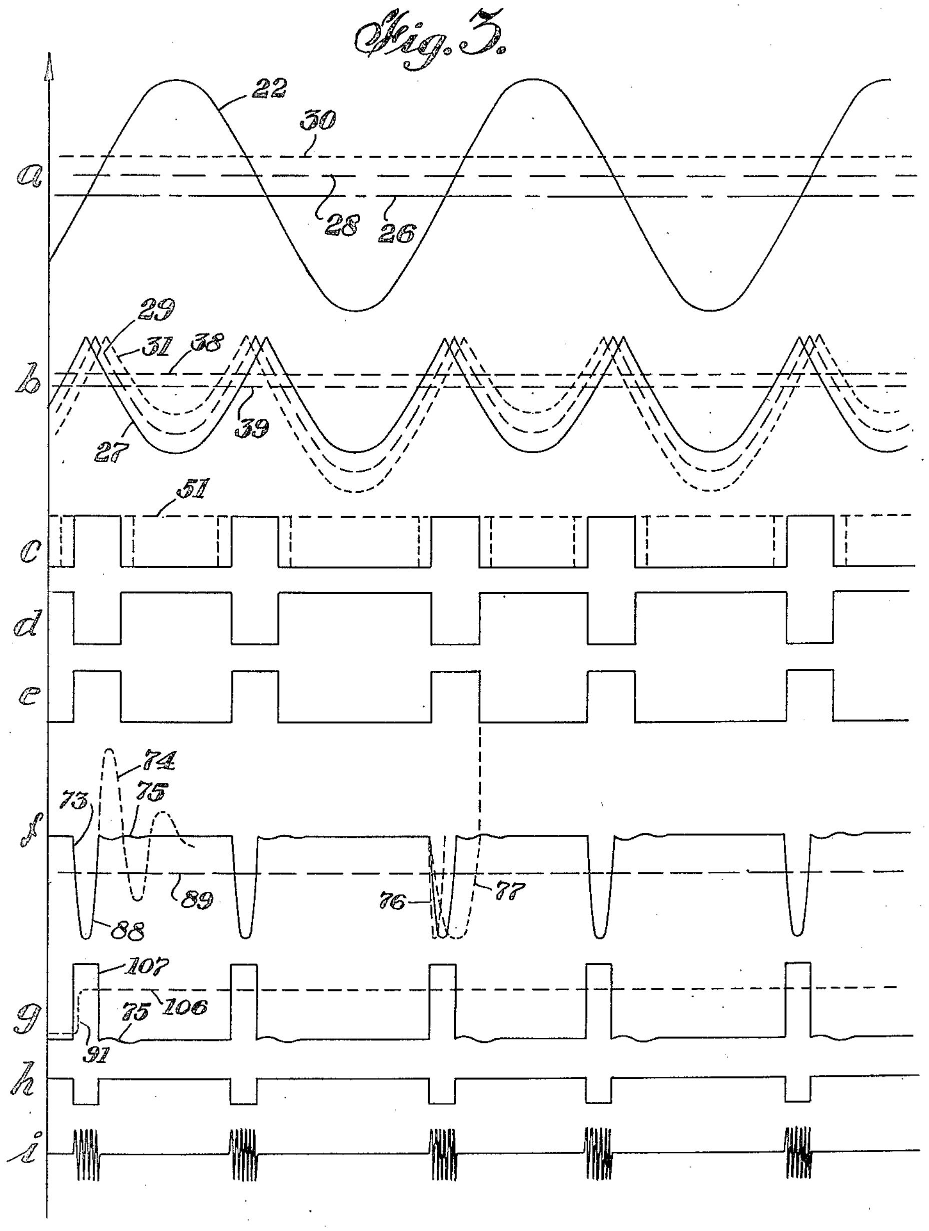
Figs. 3, 4 and 5, are sets of curves to which reference is made in describing the operation of the systems illustrated in Figs. 1 and 2.

To translate the base pulses shown in curve *c* of Fig. 3, into pulses of the desired width, the base pulses are impressed upon a resonant circuit 42, said resonant circuit comprising a capacitance 43 and an inductance 44. Either the capacitance 43 or the inductance 44, or both, may be made variable to enable tuning of said circuit to a desired frequency. Said resonant circuit is tuned to a frequency having a period equal to twice the period of the desired pulse width.

It is desirable that an impedance be placed in series with the resonant circuit 42 which is relatively high in comparison with the impedance offered by said circuit so that the potential of the pulses impressed across the resonant circuit will not be great enough in relation to the potentials developed by the free oscillations of said circuit to nullify the latter. The impedance may consist in part of an electron tube 45, preferably one of the high impedance type such as for example, a tetrode.

The resonant circuit 42 is arranged in the anode circuit of tube 45 with one end 46 of said resonant circuit connected to the anode 47 and the other end 48 of said resonant circuit connected in series with an impedance 49 to a point 50 which is connected to a source of anode potential.

Tube 45 and its associated circuit is a known limiting circuit which serves to assure that all pulses impressed upon the resonant circuit 42 will not exceed a certain amplitude, indicated by broken line 51, curve *c*, Fig. 3. The incoming base pulses shown in curve *c*, Fig. 3, are impressed, through tube 45 inverted as shown by curve *d* on the resonant circuit 42, the leading and trailing edges of said pulses tending to produce damped oscillations in said circuit. Means such as are next described may be provided for damping out or substantially critically damping certain selected undulations of said damped oscillations.

An electron tube 65 is arranged in shunt across said resonant circuit 42 with its anode 66 connected to end 46 of said circuit and its cathode 67 connected to the other end 48. The control grid 68 of said tube is connected through grid resistor 69 to point 50, grid resistor 69 being shunted by the usual grid condenser 70. Grid 68 is also connected to ground through a resistor 71 shunted by a condenser 72.

Referring now to Fig. 3, it will be seen that when positive pulses such as shown in curve *c* are impressed upon the grid 54 of tube 45, pulses of opposite polarity, shown in curve *d*, will be applied to end 46 of resonant circuit 42. The potential on grid 68, with respect to cathode 67 shown in curve *e* will be positive for the entire duration of each of the pulses of curve *c*. The leading edge of each of the pulses appearing at end 46 will shock-excite said resonant circuit into oscillation thereby producing undulations. At the first undulation 73, curve *f*, the anode 66 of tube 65 will be negative so that despite the positive voltage on grid 68, tube 65 will not conduct and a negative pulse will be delivered as output. After the undulation 73 has been produced in resonant circuit 42, the potential across said circuit reverses and tends to form undulations 74, etc., shown in dotted lines in curve *f*. However, the grid 68 of tube 65 is positive and when the potential across the resonant circuit reverses, anode 66 of the tube 65 likewise becomes positive and tube 65 conducts. The conduction of tube 65 serves to dampout undulation 74 so that instead of undulation 74, a slight ripple 75 (curve *b*) may be produced. It is preferred that the pulses impressed on grid 54 of tube 45 be of greater width than the width of any of the pulses to be produced by the width shaper circuit. Therefore when the trailing edge of the pulses impressed on grid 54 arrives, undulation 73 has already been produced, and the energy tending to form undulation 74 is being damped out through tube 65. The effects of said trailing edge which would also tend to impress a positive voltage on anode 66 of tube 65 are also damped out through the conduction of tube 65.

Since the width of the pulse 73 depends upon the tuning of the resonant circuit 42 it will be apparent that by tuning said circuit pulses of various widths may be produced, for example, a narrower pulse 76, curve *f*, Fig. 3, may be obtained by tuning said resonant circuit to a frequency greater than the frequency to which it was tuned to produce pulse 73. Likewise, pulse 77 will be produced if said resonant circuit is tuned to a frequency less than the frequency at which pulse 73 was obtained.

The width shaper and selector circuit 41 also includes a limit clipper 78 and a peak-follower threshold clipper 79, Fig. 1. The limit clipper 78 may be of any known variety and preferably has means for varying the level at which the clipping is produced. The grid 83 of tube 84 is biased close to cut-off so that the tube will not pass the tips 88 of the pulses extending beyond level 89 as shown in curve *f*, Fig. 3. By varying the bias applied to grid 83, the level 89 may be varied. For example, a tapped potentiometer 85 with its resistance connected to a source of biasing potential may be used for this purpose.

The pulses 91 delivered by limiter circuit 78 will thus appear as illustrated in curve *g*, Fig. 3. The pulses 91 are substantially rectangular and have the desired pulse width. It will be noticed, however, that the ripple 75 is not eliminated. In the peak-follower threshold clipper 79, this ripple disappears and a rectangular pulse form remains. In the peak-follower threshold clipper 79, pulses 91 are fed through a switch 93 and a condenser 94 to the grid 95 of an electron-discharge tube 96. The grid circuit includes a resistor 97 and a biasing resistor 98, the latter being shunted by the usual by-pass condenser 99. The anode 101 of tube 96 is connected through the usual load resistor 102 to the positive end 103 of a source of potential having its negative end connected to ground and through ground back to the cathode 100 through resistor 98. Potentials developed across resistor 102 are delivered as output to the next stage.

The operation of such peak-follower threshold clippers is understood in the art. Therefore, only a brief description will be given. When a positive potential, such as a pulse 91 is applied to side 104 of condenser 94, grid current will flow charging side 104 positively and side 105 negatively. Thus a negative potential will be applied to the grid 95, this potential being proportional to the value of the pulse applied. The time constant of condenser 94 and its associated resistors is such that the condenser will lose its charge relatively slowly. Thus assuming that the first pulse of curve *g* is the first pulse applied to condenser 94, the charge on condenser 94 will rise to a level such as that indicated by the broken line 106. The charge will remain at this level as only a small quantity of the charge will be dissipated during the intervals between pulses, and this will be replenished by each succeeding pulse.

The effect of the charge on condenser 94 is to maintain a cut-off bias on tube 96 at the level designated by broken line 106, curve *g*, Fig. 3. Therefore, only the portions 107 of pulses 91 which appear above said level will be passed by said tube 96 and delivered as output. It will be therefore seen that the function of the peak-follower threshold clipper 79 is to clip off a fixed amount from the top of each of the incoming pulses regardless of the amplitude of such pulses.

If pulses of lesser amplitude than the level designated by numeral 106 in curve *g* occur between pulses 91, said lesser pulses would not appear in the output because of the clipping level. It will, therefore, be seen that the peak-follower clipper serves to separate pulses of different amplitudes and to select only those pulses having greater amplitudes. As will be explained hereinafter, the position of level 106 varies with the amplitude of the pulses received so that if all the pulses received are of smaller amplitude than the pulses shown in curve *g*, the level 106 will be proportionately, lower. But since the level will be lower, the tips of these latter pulses, despite their lesser amplitude, will be passed to the output. It will thus be seen that the clipping level tends to be proportioned to the level of the pulses of maximum amplitude present, regardless of whether said maximum amplitude is in absolute terms large or small.

If common line transmission is to be employed, the output of the peak and follower clipper 79 may be directly delivered to the line, or applied through amplifiers thereto. If, however, the transmission is to be accomplished through a radio link, said output is delivered through the switch 40 to a radio frequency translator 110 where it is impressed with a carrier frequency, curve *i*, Fig. 3, and from thence through switch 40 to an antenna system 111.

While I have shown the pulses as being both generated and modulated in pulse generator and modulator 15, it is to be understood, of course, that such modulation may be accomplished, after the pulses have been shaped in width shaper and selector circuit 41, by a modulator incorporated in the R. F. translator 110. The source of the electrical signal 34, may be connected by means of jack 112 to the radio frequency translator and produce time modulations of the pulses in said translator.

Circuit 41 not only functions as a width shaper as has been explained hereinbefore, but also serves to select pulses of the desired width. If common line transmission is used, the incoming pulses may be directly applied to said circuit or applied thereto through an amplifier.

In the case of a radio link, an antenna system which may be the same antenna system 111 used for transmission may also be employed for reception. Such double use of the antenna system is likely to be especially desirable with portable transmitting and receiving systems. The circuit illustrated in Fig. 1 is particularly adapted for such portable use.

Figure 4:
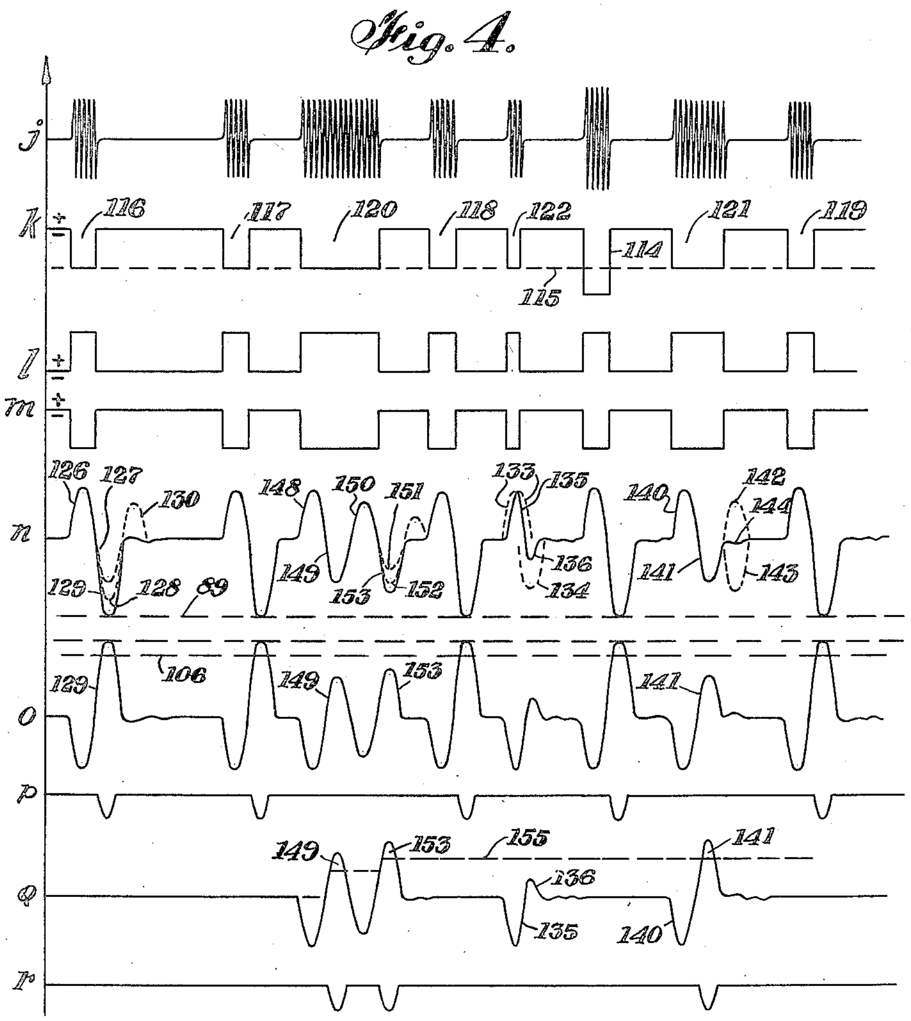

Assuming that pulses of various widths are received as illustrated in curve *j*, Fig. 4, these pulses are preferably passed through a carrier frequency amplifier and detector 113 leaving only the envelope of the pulses as shown in curve *k*. The output of amplifier and detector 113 is preferably in the form of pulses negative with respect to ground, as shown by the curve *k*, this output being delivered to the width shaper and selector circuit 41 through switch 40. It will be noted that while the pulses to be shaped were of positive polarity with respect to ground (curve *c*, Fig. 3), the pulses to be selected are of negative polarity (curve *k*, Fig. 4).

It is preferred that the gain of the amplifier and detector 113 be such that the pulses which are to be selected (curve *k*, Fig. 4) should be of less amplitude than the pulses which are to be shaped (curve *c*, Fig. 3). The pulses which are delivered to the input of the width shaper and selector circuit 41 are impressed through tube 45 on resonant circuit 42. It is preferred that the impressed pulses be of constant amplitude. For this purpose suitable means may be provided in the amplifier and detector 113, or this may be accomplished by means of the limiting action of tube 45 and its associated circuit. For this purpose it may be necessary to vary the level at which said tube limits when shifting from transmission to reception. Where for example, occasional pulses of unusually large amplitude like pulse 114, curve *k*, Fig. 4, are delivered to tube 45, it may be desirable to adjust the circuit associated with said tube to provide limiting action at the level 115, curve *k*, to assure obtaining pulses of constant amplitude.

The received pulses, the envelopes of which are shown in curve *k*, may include, for example, pulses 114, 116, 117, 118, and 119 which are of the desired width, as well as pulse 120 which is three times the desired width, pulse 121 which is twice the desired width and pulse 122 which is half the desired pulse width. These pulses being negative, as shown by curve *k* of Fig. 4 will appear as positive pulses at point 46, as shown in curve L of Fig. 4, and will produce negative voltages in pulse form on grid 68 with respect to cathode 67 (curve *m*) corresponding in width to the received pulses.

It will be remembered that in order to shape the pulses to be transmitted to a desired width, resonant circuit 42 was tuned to a frequency having a period equal to twice said desired width. Thus the leading edge of the pulses to be transmitted produced by shock-excitation oscillations of the resonant circuit in which each half cycle had a period or width equal to the desired width.

When it is desired that the receiver be tuned to select pulses of the same width as is transmitted, no adjustment of the resonant circuit 42 is necessary and the circuit is kept tuned to the same frequency, that is, a frequency having a period equal to twice the period of the desired width.

The leading edges of the pulses 114, and 116 through 121 will all shock-excite resonant circuit 42 into oscillation. More specifically, the leading edge of pulse 116 will produce a positive undulation 126 (curve *n*) which is the first half cycle of the damped oscillations of circuit 42. The next undulation would tend to be a negative undulation 127 of lesser amplitude because of the inherent damping of the circuit. The beginning of undulation 127 would occur at the time of the arrival of the trailing edge of pulse 116. This trailing edge tends to produce an undulation 128. The effects which tends to produce undulations 127 and 128 combined to produce an undulation 129 of relatively large amplitude.

The negative undulation 129 tends to be followed by a positive undulation 130 of lesser amplitude. But it will be noted that after the trailing edge of pulse 116 has passed, the grid 54 of tube 45 becomes less negative, tube 45 conducts, and there is a current flow across resistor 49. Therefore a positive potential is applied to grid 68 of tube 65, and said tube will conduct at any time after the trailing edge of pulse 116 has passed, provided a positive voltage is applied to its anode 66. At the end of undulation 129, such positive voltage is applied to anode 66, and tube 65 therefore conducts and substantially damps out any further oscillations in circuit 42. Pulses 114, 117, 118 and 119 which are of the desired width, will all produce the same effects.

Undulations 126 and 129 then pass through the limit clipper 78. It is preferred that the level 89 at which said clipper operates should be greater than the peak of undulation 129, so that no limit clipping occurs. However, if the negative undulations produced by the received pulses are of greater amplitude than the level 89, it may be desirable when changing over from transmission to reception to shift said level in order to prevent clipping of these undulations. This shift may be accomplished by an adjustment of potentiometer 85 in the limit clipper 78.

The polarity of the pulses is reversed in the limit clipper 78 so that at the output of clipper 78 the pulses appear as shown in curve *o*, Fig. 4. These pulses are then passed through the peak follower threshold clipper 79 and are clipped at level 106, which is the same level designated by like number in curve *g*, Fig. 3, to thereby deliver at the output of clipper 79 pulses such as shown in curve *p*.

Pulse 122, curve *k*, Fig. 4, is of less than the desired pulse width. The leading edge of pulse 122 will shock-excite circuit 42 and tend to produce undulation 133 shown in dotted lines in curve *n*. The trailing edge of pulse 122 will tend to produce undulation 134 also shown in dotted lines in curve *n*. The resultant oscillation produced will consist of a positive undulation 135 and a negative undulation 136. The negative undulation 136 will be of very small amplitude in comparison with negative undulation 129 produced by a pulse of the selected width. The small amplitude of undulation 136 is due to the out of phase relations of undulations 133 and 134, and may also be partially due to loss of energy through conduction of shunt tube 65 which tends to rapidly damp undulation 133. Since it is the negative undulations of curve *n* which are clipped in the peak-follower threshold clipper 79 and since negative undulation 136 is of insufficient amplitude to be clipped, said undulation will have no effect on the output. Thus it will be seen that a pulse which is of less than the selected width will be eliminated.

Figure 9:
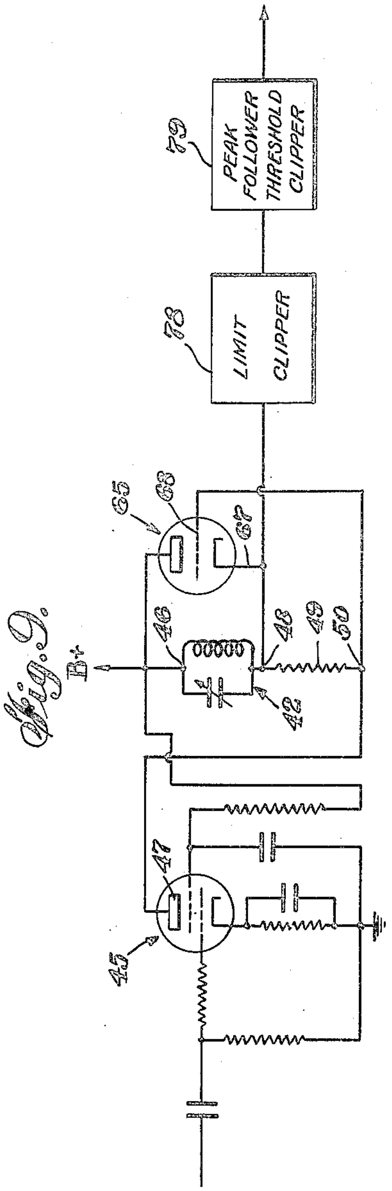
Fig. 9 is a schematic diagram of a portion of a modified form of the pulse-width shaper and selector circuit.

Pulses of greater than the selected width will likewise be eliminated since their negative undulations will be of lesser amplitude than undulation 129. For example, 121, curve *k*, Fig. 9, is twice the selected width. The leading edge of pulse 121 produces a positive undulation 140 followed by a negative undulation 141 which tends to be followed by another positive undulation 142 shown in dotted lines, curve *n*. But at the end of undulation 141, the trailing edge of pulse 121 intervenes tending to produce a negative undulation 143. The resultant is a slight negative undulation 144. It will be noted that negative undulation 141 is of considerably less amplitude than negative undulation 129 produced by pulse 116 of the selected width. Therefore, undulation 141 will be eliminated in the peak-follower clipper 79.

Pulses having a width which is an odd multiple of the selected width will produce negative undulations greater than those produced by even multiples but of less amplitude than the undulations produced by pulses of the selected width. For example, pulse 120, curve *k*, Fig. 4, has a width equal to three times the selected width. The leading edge of said pulse produces positive undulation 148, negative undulation 149, and positive undulation 150. Positive undulation 150 tends to be followed by a negative undulation 151 shown in dotted lines, curve *n*. It will be noted that negative undulation 151 is of considerably less amplitude than negative undulation 149 due to the damping of the circuit. The trailing edge of pulse 120 tends to produce an undulation 152. Undulations 151, 152 add to produce undulation 153. But since undulation 151 is of lesser amplitude than undulation 149, or the corresponding undulation 127 produced by pulse 116, undulation 153 will be of lesser amplitude than undulation 129. Consequently undulation 153 will be of insufficient amplitude to be clipped by the peak-follower clipper 79. It will therefore be seen that while pulses of a width equal to an odd multiple of the selected width will produce undulations having greater amplitude than those produced by even multiples of said selected width, the aforesaid undulations will still be of lesser amplitude than those produced by pulses of the selected width.

From the foregoing it will be seen that pulses of the selected width will be translated into negative undulations of maximum amplitude and that pulses of other widths will produce negative undulations of lesser amplitude. This variation in amplitude of the negative undulations produced tends to vary sinusoidally with varying deviations from the selected pulse width.

Figure 5:
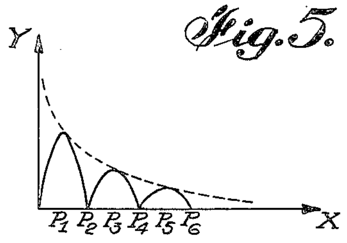

This is illustrated in Fig. 5 where the amplitude of the negative undulations produced is plotted along the Y axis against the width of the pulses along the X axis. Point $p_1$ represents the selected width, point $p_2$ twice the selected width, point $p_3$ three times the selected width, etc. It will be seen that the maximum amplitude occurs at $p_1$. It will be noted that on both sides of $p_1$, the amplitude declines sinusoidally. At point $p_2$ the amplitude of the negative undulations is at a minimum. It then increases from $p_2$ to $p_3$ until at $p_3$, which is the first odd multiple of $p_1$, there occurs another peak. The peak at $p_3$ is less than the peak at $p_1$ because of the damping occurring in resonant circuit 41. The same variation is again repeated with the new peak at $p_5$ which is lesser in amplitude than peak $p_3$.

When pulses of the selected width, such as pulses 114 and 116 through 119 are being received, the undulations 129 produced by such pulses will have the amplitude indicated in curve *n* and will be clipped at the level indicated by broken line 106, curve *o*. If such pulses are not being received, then the level at which the peak-follower threshold clipper operates will vary and will be of a value generally determined by the maximum amplitude of the undulations present. This is illustrated in curve *q*, Fig. 4, which represents the input to the peak-follower threshold clipper 79, when no pulses of the selected width are present. Numeral 155 designates the clipping level. It will be seen that this level rises from zero value to a given value at undulation 149 and to a greater value at undulation 153. Thus the peaks of undulations 149 and 153 will be clipped and delivered as output as will also be the peak of undulation 141.

From the foregoing it will be seen that when pulses of the selected width are being received, pulses of other widths will be eliminated in the width shaper and selector circuit 41. In the absence of pulses of the selected width, other pulses will be received and transmitted through said circuit 41. Furthermore the resonant circuit 42 may be tuned to shape and select pulses of any desired width within the limits imposed by the parameters of the system.

A fixed level threshold clipper 156 may be used in place of the peak-follower threshold clipper 79. With such a clipper, the clipping level 106 would be fixed so that only the positive undulations shown in curve *o* which have a greater amplitude than level 106 would be accepted. Since such undulations are only produced by pulses of substantially the selected width, it will be obvious that by using a fixed clipper 156 only pulses of the selected width would be received and in the absence of such pulses of the selected width, no other pulses would be received. With this arrangement, it becomes possible by a single adjustment of resonant circuit 42 to select the width of the pulses to be transmitted and by the same operation limit the receiver to receiving only pulses of said selected width. This arrangement, therefore, provides for single channel transmission and reception at any one time and differs from the arrangement using the peak-follower clipper in that when the latter is employed, the reception may be multi-channel.

The output of the width shaper and selector circuit 41, which includes the clippers 78 and 79, and alternatively clipper 156, is delivered to a demodulator circuit 157 (Fig. 1). This output is applied to the control grid of the demodulator tube 161 and causes tuned circuit 173 connected to the screen grid of the tube, to oscillate at a desired frequency producing in the output circuit of tube 161 a combined wave in the form of a combination of the wave generated in the circuit 173 and the incoming pulses. The circuit 173 is preferably tuned to some harmonic of the cadence frequency of the pulses when they are unmodulated, so that as the pulses are time-displaced due to modulation signals, the output pulses of tube 161 will be raised to different levels depending upon their time displacement. Accordingly, in the output of tube 161 there will appear a modulation envelope of pulses carrying signal modulations according to the amplitude measurements thereof. For a further understanding of the principles of this type of modulator, reference may be had to the copending application of D. D. Grieg, Serial Number 459,959, filed September 28, 1942, now Patent No. 2,416,306, issued February 25, 1947.

A low pass filter 176 is provided to by-pass the high frequency pulse components and pass on the modulation frequencies that define the signal envelope.

From the foregoing description it will be seen that I have provided a pulse time modulation system including a single, common width shaper and selector circuit 41 which serves not only to shape the pulses to be transmitted to a desired width but also serves to select received pulses of said desired width.

In the embodiment shown in Fig. 1, a multiple type switch 40 is employed to connect the transmitter or the receiver to the width shaper and selector circuit 41 and is likewise used to connect either the transmitter or receiver to the antenna system 111. Instead of a switch, however, other devices may be used which will permanently connect both the transmitter and receiver to the grid shaper and selector circuit 41 without the necessity of manipulation. In common line transmission, and in other uses where the repetition frequency of the pulses is not very high, hybrid coils may be used for this purpose. However, in other cases, where the frequencies are too high for conveniently using hybrid coils, an electronic mixer circuit and an electronic distributor circuit may be used to connect both the transmitter and receiver to circuit 41.

Figure 2:
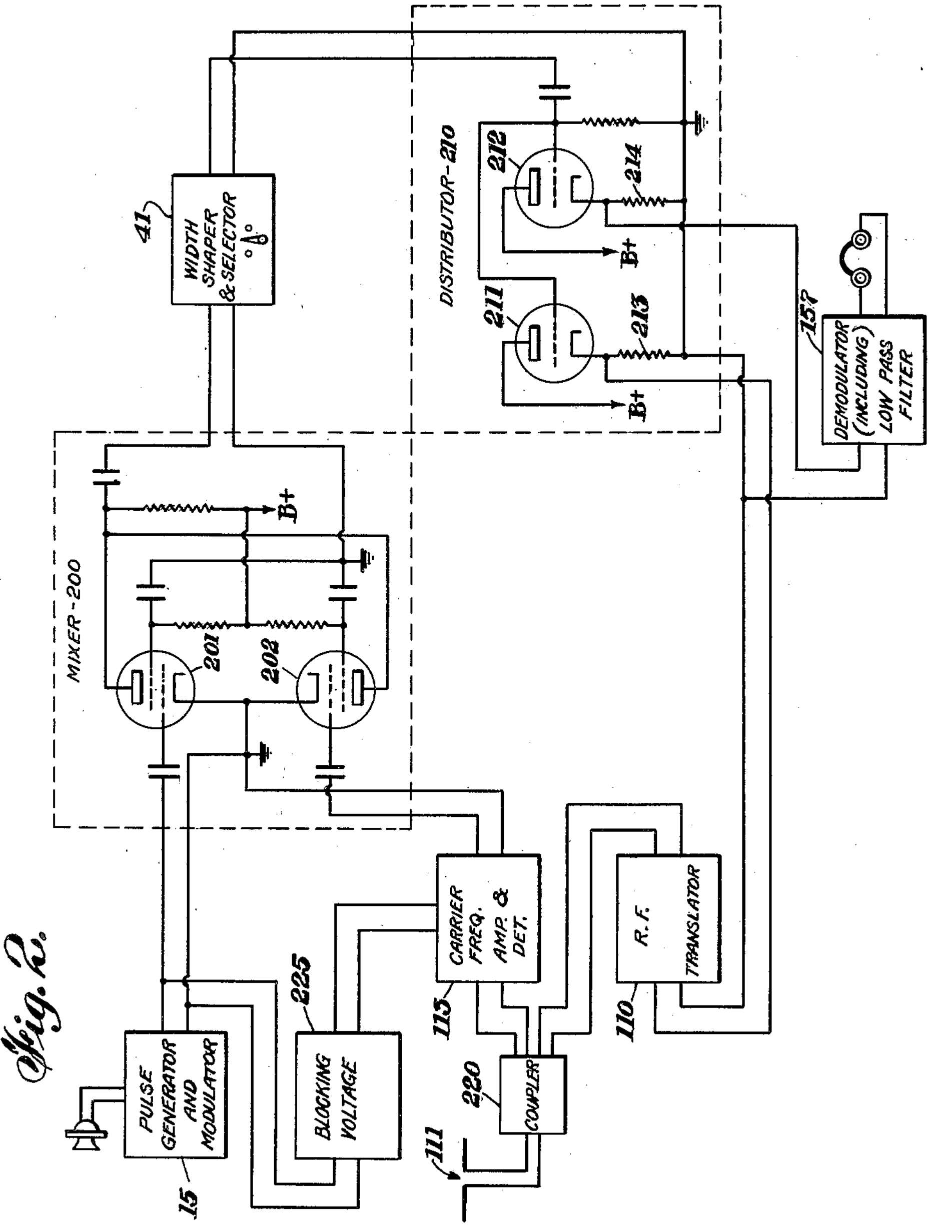
Fig. 2 is a schematic and block diagram of a modification of the system illustrated in Fig. 1.

A preferred embodiment utilizing electronic mixer and distributor circuits is illustrated in Fig. 2. The output of pulse generator and modulator 15 is delivered to the grid of tube 201 of a mixer stage 200. The mixer stage also includes another tube 202 whose grid is in turn connected with the output of the carrier frequency amplifier and detector 113. It will thus be seen that the pulses to be shaped are impressed upon tube 201 and the received pulses from which selection is to be made according to pulse width is impressed upon tube 202. The anodes of tubes 201 and 202 are connected together and to the width shaper and selector circuit 41. Because of the arrangement of the mixer 200 there will be no reaction between the pulse generator and modulator 15, and the carrier frequency amplifier and detector 113. To insure against such reaction through the interelectrode capacities of tubes 201 and 202, such tubes are preferably of the type having high internal impedance such as tetrodes.

The output of the width shaper and selector circuit 41 is delivered to the electronic distributor 210. The distributor 210 is of the cathode follower type having negative feed-back produced by an unby-passed resistor in the cathode leads of tubes 211 and 212. The negative feed-back serves to produce a more linear and stable operation. The output of the width shaper and selector circuit 41 is applied to the grids of tubes 211 and 212. The potential developed across the cathode resistor 213 is delivered to the radio-frequency translator 110 while the potentials developed across the cathode resistor 214 are delivered to the demodulator 157. It will therefore be seen that because of the arrangement of the distributor 210, no inter-reaction will occur between the R. F. translator 110 and the demodulator 157.

The output of the R. F. translator 110 is fed through a coupler 220 to the antenna system 111. The pulses received by the antenna system 111 are fed back through said coupler to the input of the carrier frequency amplifier and detector 113.

A blocking voltage generator 225, synchronized with pulses produced in the pulse generator and modulator 15, supplies blocking voltages to a mixer stage in the carrier frequency amplifier and detector 113 so that whenever pulses are being impressed upon the grid of tube 201 by the pulse generator and modulator 15, the carrier frequency amplifier and detector 113 is blocked so that no pulses are impressed upon the grid of tube 202. It will therefore be seen that no interference will occur in the width shaper and selector circuit 41 and the distributor 210 between pulses that are to be transmitted and pulses that are received.

With the arrangement shown in Fig. 2 the width shaper and selector circuit 41 is connected both to the transmitter and to the receiver and no manipulation is necessary to switch from one to the other. If, however, the carrier frequency amplifier and detector has too high a gain so that the received pulses are of the same amplitude as the pulses to be transmitted, it may be advisable to change the bias and level of operation of the limit clipper 78 which forms part of the width shaper and selector circuit 41 (see Fig. 1). For this purpose, the potentiometer 85 may be adjusted from one tap to another. Ordinarily, however, if the gain of the carrier frequency amplifier and detector 113 is properly adjusted, such change will be unnecessary.

Figure 6:
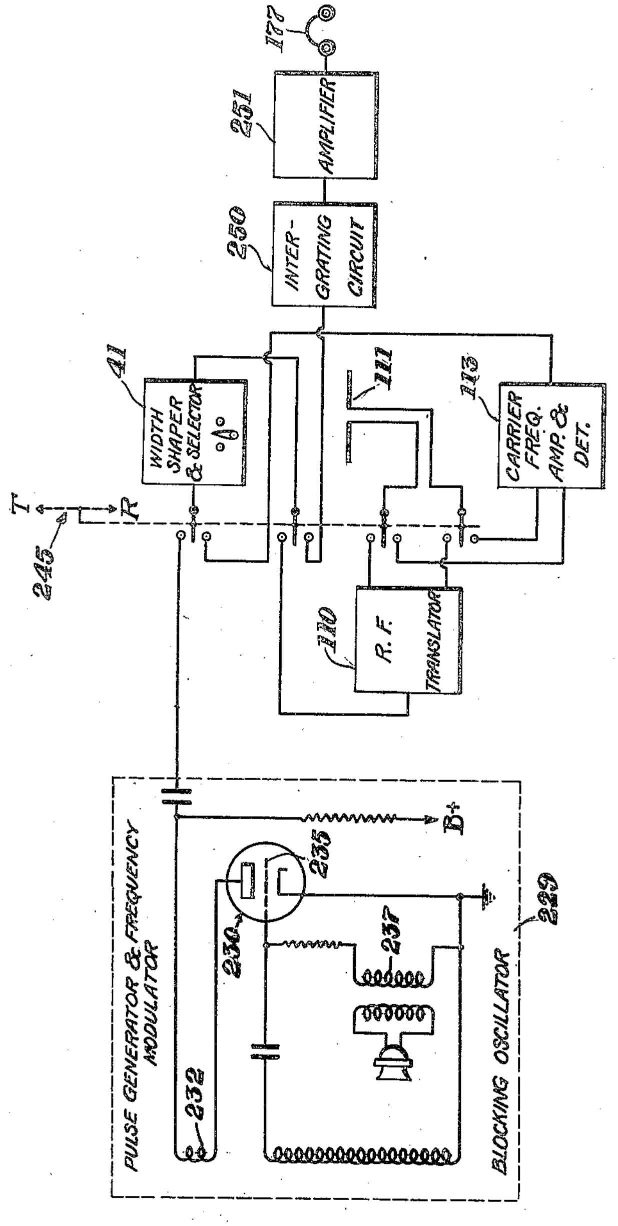
Fig. 6 is a schematic and block diagram of a frequency modulated pulse communication system embodying this invention.

As stated hereinbefore my invention is also applicable to frequency-modulated pulse systems and one such system embodying my invention is illustrated in Fig. 6. Any suitable means may be employed for generating and frequency-modulating the pulses. One suitable form is shown by way of example as including a blocking oscillator 229. The time constant of condenser 234 and its associated resistances is chosen so that a charge builds up on said condenser which periodically blocks conduction of the tube 230. When this charge leaks off, the tube will again start to oscillate. By applying a modulating voltage in series with the grid 235 of tube 230 the time at which tube 230 will again begin to conduct after having been blocked by the potential on condenser 234 may be varied. Thus the output of the blocking oscillator will consist of pulses which are frequency modulated in accordance with the signal energy.

This output may then be fed through a multiple switch 245 to a width shaper and selector 41 to shape the pulses to the selected width, and through the R. F. translator 110 to the antenna system 111.

The pulses received by the antenna system 111 are fed to the carrier frequency amplifier and detector 113, thence through width shaper and selector circuit 41 to an integrating circuit 250 of any known type which will translate the frequency-modulated pulses into amplitude-modulated energy. The output of the integrating circuit 250 may then be fed through an amplifier 251 to the utilization device, which may be for example, a speaker 177 or any other indicating device.

This invention is also applicable to amplitude modulated pulse systems. One form of amplitude modulated pulse system embodying my invention is illustrated in Fig. 7 and its operation is described in connection with the curves of Fig. 8.

Figure 7:
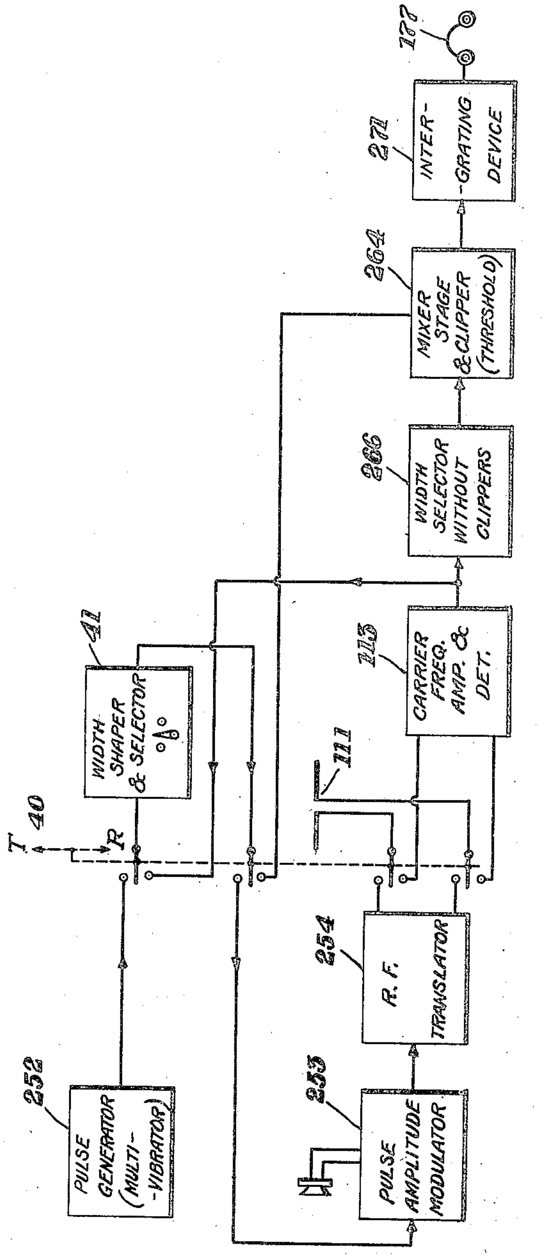
Fig. 7 is a schematic and block diagram of an amplitude modulated pulse communication system embodying this invention.

Referring to Fig. 7, pulses may be generated by any suitable means such as, for example, a multivibrator 252. The pulses are then fed through the width shaper and selector circuit 41 where they are shaped to the desired width. They are next fed through switch 40 to a pulse amplitude modulator 253 which may be of any known type. The pulses are then amplitude-modulated in accordance with the signal and delivered to a radio frequency translator 254 whose output is in turn fed to the antenna system 111.

Amplitude modulated pulses which are received in antenna system 111 are fed through switch 40 to the carrier frequency amplifier and detector 113. The output of said amplifier detector 113 is separated into two different channels. It is preferred that the output of carrier frequency amplifier and detector 113 consist of negative pulses with respect to ground. One portion of said output is fed to the width shaper and selector circuit 41.

Figure 8:
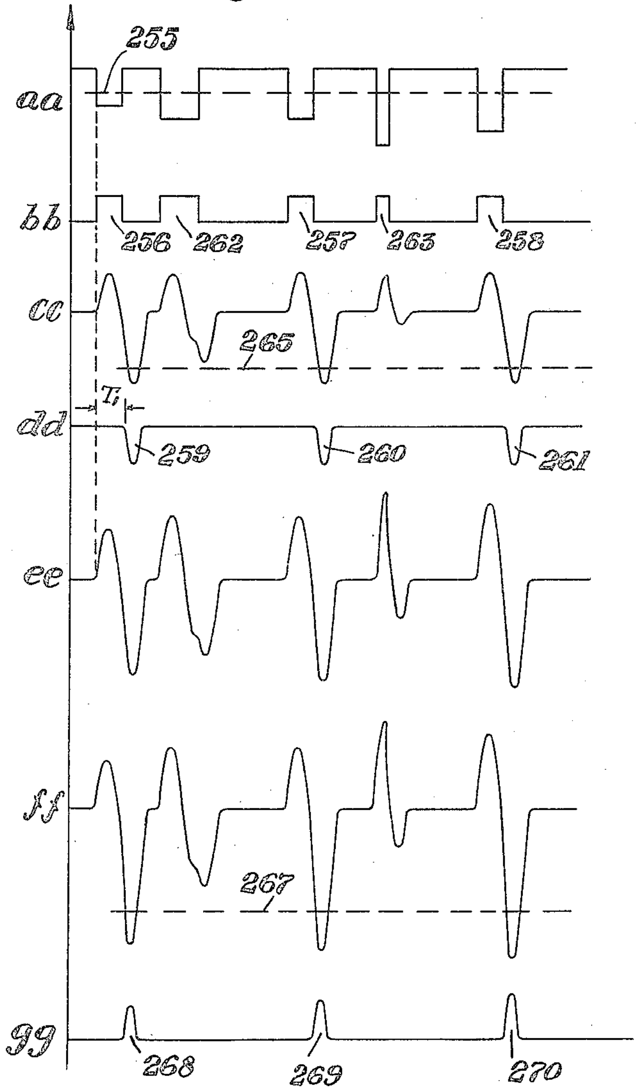
Fig. 8 is a set of curves to which reference is made in describing the operation of the system illustrated in Fig. 7.

Assuming that the received pulses consists of pulses of various widths and amplitudes such as shown in curve *aa* of Fig. 8, these pulses will be limit-clipped along the line 255 by tube 45 of the width shaper and selector circuit 41. Thus a series of positive pulses, such as shown in curve *bb* of Fig. 8, of equal amplitude but of different widths, will be applied to the resonant circuit 42 of the width shaper and selector circuit 41. Assuming that pulses 256, 257 and 258 of curve *bb* are of the selected width, undulations such as those shown in curve *cc* of Fig. 8 will be produced by resonant circuit 42. These are clipped along the level 265 in the peak-follower threshold clipper 79 thus delivering as the output of the width shaper and selector circuit 41 negative pulses 259, 260 and 261, curve *dd*, Fig. 8, each of which begins at the trailing edge of its corresponding pulse 256, 257 and 258 of curve *bb*. It will thus be seen that these pulses are delayed for a time $T_1$ equal to the width of any of the pulses 256, 257 or 258.

Pulses 262 and 263 of curve *bb* which are pulses of other than the selected width, will be suppressed within the width shaper and selector circuit 41. The output of the width shaper and selector circuit 41 is fed to a mixer stage 264 which includes a threshold clipper.

The positive pulses shown in curve *aa* which are the output of the carrier frequency amplifier and detector 113 are fed not only to the width shaper and selector circuit 41 but also to a width shaper and selector circuit 266. Circuit 266 is similar to that of circuit 41 but does not include the clipper stages 78 and 79. Moreover the constants of the circuit including tube 45 are such that no limiting action is produced. Thus when the pulses shown in curve *aa* are impressed on the circuit 266, the resonant circuit of said width shaper and selector will oscillate producing undulations such as shown in curve *ee*. It is to be remembered that the input of circuit 266 consists of pulses varying in width as well as in amplitude. Pulses having the desired width will tend to produce greater negative undulations than pulses having other widths. The voltages shown in curve *ee* are fed into the mixer stage in clipper 264 where they are added to the voltages shown in curve *dd*. They are then threshold-clipped along level 267 to thereby derive pulses 268, 269 and 270 which vary in amplitude in accordance with their original amplitude variations.

By adding the output of the width shaper and selector circuit 41 which consists solely of pulses of the desired width to the output of width shaper and selector circuit 266 which includes pulses both of the desired width and other widths, but which latter circuit tends to discriminate in amplitude in favor of pulses of the desired width, the pulses of the desired width are given a sufficient additional amplitude so that they may be distinguished or separated by the threshold clipper from pulses having other widths.

Circuit 266 not only serves, as stated hereinbefore, to discriminate in favor of pulses of the desired width but also serves to produce a time delay equal to $T_1$ for the negative undulations as shown in curve *ee*, the same as in circuit 41. Thus pulse 259, and its corresponding negative undulation of curve *ee* occur at the same time, and therefore can be added in the mixer stage.

Pulses 268, 269 and 270 are then fed through an integrating device 271 to the utilization device 177 as explained in connection with Fig. 1.

From the foregoing it will be seen that I have provided a pulse amplitude modulation system embodying a width shaper and selector circuit which is common to both the transmitter and receiver and which when tuned to shape a transmitter pulse to a certain width will also serve to select a received pulse of said certain width.

A modified form of the width shaper and selector circuit is illustrated in Fig. 9. This circuit is similar to that described in the co-pending application of Emile Labin and myself, filed May 15, 1943, Serial Number 487,072, now Patent No. 2,440,278, issued on April 27, 1948, for "Pulse Selecting and Eliminating System." The circuit illustrated in Fig. 9 differs from that illustrated in Fig. 1 in the following respects.

The connection of anode 47 and the connection of the source of positive potential to the circuit consisting of resonant circuit 42 and resistor 49 are reversed. That is, anode 47 is connected to point 50 and the source of positive potential is connected to end 46 of the resonant circuit 42. The output is taken off the cathode 67 of shunt tube 65 instead of off its anode. With this arrangement, no bias is required on grid 68 of the shunt tube. The operation of this circuit is similar to that of width shaper and selector circuit 41, and will be described with reference to Figs. 10 and 11.

Figure 10:
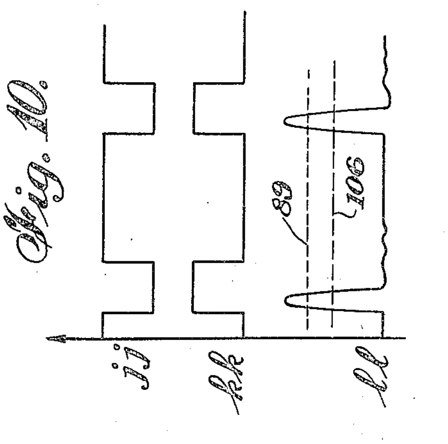

When the circuit of Fig. 9 is to be used as a shaper the pulses supplied thereto are preferably negative pulses, curve *jj*, Fig. 10. These produce positive potentials, curve *kk*, on anode 47 which are in turn applied through resistor 49 to end 48 of resonant circuit 42. Thereupon resonant circuit 42 oscillates, producing positive undulations, curve LL which are clipped at the levels 89 and 106 respectively by limit clipper 78 and peak-follower threshold clipper 79, to thereby produce pulses of the selected width. No negative undulations are produced in curve LL because shunt tube 65 will conduct when its cathode becomes negative.

Figure 11:
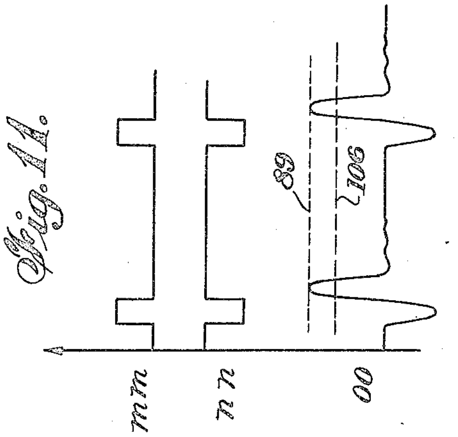
Figs. 10 and 11 are sets of curves to which reference is made in describing the operation of the circuit illustrated in Fig. 9.

For width selection purposes, positive pulses are supplied to the input of the circuit of Fig. 9, curve *mm*, Fig. 11. The potentials impressed on end 48 of resonant circuit 42 by these pulses are negative, curve *nn*. The leading and trailing edges of the pulses shock-excite resonant circuit 42 to produce undulations, curve *oo*. These are then clipped between the levels 89 and 106 to thereby select pulses of the desired width, it being understood that the positive undulations, produced by pulses having widths other than the desired width, will be of lesser amplitude than those produced by pulses of the desired width. Shunt tube 65 becomes ready to conduct at any time after the trailing edge of a pulse has passed and will conduct when a negative potential is applied to cathode 67. This negative potential appears after the positive undulations of curve *oo* and the consequent conduction of tube 65 critically damps the energy in resonant circuit 42.

It will therefore be seen that the circuit of Fig. 9 may be used as a pulse width shaper and selector circuit in place of the circuit of Fig 1, in any of the systems disclosed. But, in such case, the polarities of the pulses applied to the input are reversed.

While I have described my invention in detail and several applications thereof, it will be readily apparent that my invention is of broader scope than the specific types illustrated. Additional applications of my invention will be apparent to those versed in the art. For example, I have shown my invention in connection with only one type of time-modulated pulse system. Obviously, it may be used with various other types of time modulation as well as other types of frequency and amplitude modulation than those herein illustrated. I have herein shown two specific arrangements for the width selector circuit. It is, of course, to be understood that the specific arrangements of these may also be varied in view of the teachings herein. Accordingly, while I have described above, the principles of my invention in connection with specific embodiments, it is to be clearly understood that this description is made only by way of example and not as a limitation on the scope of my invention.

I claim:

1. In a system for selecting wave energy pulses of different widths, means for translating pulses of various widths into pulses of various amplitudes, pulse amplitude discriminating means, and means responsive to the pulses of greater amplitude for causing said pulse amplitude discriminating means to select the pulses of greater amplitude to the exclusion of pulses of lesser amplitude.

2. In a wave energy pulse receiver, means for translating pulses of different widths into pulses of different amplitudes, said translating means being adapted to translate pulses of a selected width into pulses of greater amplitude, means for selecting pulses according to their amplitudes, and means responsive to said pulses of greater amplitude for causing said selecting means to select said pulses of greater amplitude to the exclusion of pulses of other amplitudes.

3. In a system for selecting wave energy pulses of different widths, means for translating pulses of various widths into pulses of various amplitudes, said translating means being adjustable to translate pulses of a desired width into pulses of the greater amplitude and pulses of other widths into amplitudes approximately corresponding to their proximity to said selected width, amplitude discriminating means, and means responsive to the pulses of the greater amplitude present for causing said amplitude discriminating means to select said pulses of the greater amplitude present to the exclusion of pulses of lesser amplitude.

4. In a system for selecting wave energy pulses of different widths, means for translating pulses of various widths into pulses of various amplitudes, said translating means being adjustable to translate pulses of a desired width into pulses of the greater amplitude, and a peak following threshold clipper, having means responsive to the amplitude of the pulses from said translating means for varying its clipping level, to select pulses of the greater amplitude present.

5. In a system for selecting wave energy pulses of a given width, means for translating pulses of different widths into pulses of different amplitudes, said translating means being adapted to translate pulses of said given width into pulses of the greater amplitude and pulses of other widths into amplitudes approximately corresponding in magnitude to their proximity to said given width or an odd multiple thereof, and a peak following threshold clipper, having means responsive to the amplitude of the pulses from said translating means for varying its clipping level, to select pulses of the greater amplitude present.

6. In a system for selecting wave energy pulses of different widths, means for translating pulses of various widths into undulations of various amplitudes, said translating means including a shock-excitable resonant circuit including tuning means, means for applying said pulses to said circuit to shock-excite said circuit into damped oscillations, said resonant circuit being tuned to a frequency having a period equal to twice the period of the desired pulse width to thereby translate pulses of said desired width into undulations of greater amplitude, and a peak following threshold clipper, having means responsive to the amplitude of the undulations from said translating means for varying its clipping level, to select undulations of the greater amplitude present.

7. In a system for selecting wave energy pulses of different widths, means for translating pulses of different widths into undulations of various amplitudes, said translating means including a shock-excitable resonant circuit, means for applying the leading and trailing edges of said pulses to said circuit to shock-excite said circuit into damped oscillations, said resonant circuit being tuned to a frequency having a period equal to twice the period of the desired pulse width so that the trailing edge of a desired pulse width imparts greater amplitude to the undulation immediately following it, means for substantially damping out all undulations after the one immediately following the trailing edge of each pulse, and a peak following threshold clipper, having means responsive to the amplitude of the undulations from said translating means for varying its clipping level, to select undulations of the greater amplitude present.

8. In a system for shaping wave energy pulses to a desired width and selecting from wave energy pulses of different widths those pulses of said desired width, a resonant circuit tuned to a frequency having a period equal to twice that of the desired pulse width, first means for applying the pulses to be shaped to said circuit, second means for applying to said circuit the pulses from which selection is to be made, control means for determining which of said first and second means is rendered operative, said circuit being excited into oscillation by the applied pulses, and means for segregating portions of the oscillations and delivering them as output pulses.

9. In a system for shaping wave energy pulses to a desired width and selecting from wave energy pulses of different widths those pulses of said desired width, a resonant circuit adapted to be tuned to a frequency having a period equal to twice that of the desired pulse width, means for applying with one polarity the pulses to be shaped, and with an opposite polarity the pulses from which selection is to be made, to said circuit to excite said circuit into oscillation, and means for segregating portions of the oscillations and delivering them as output in the form of pulses.

10. In a system for shaping wave energy pulses to a desired width and selecting wave energy pulses of said desired width, a limiter circuit for limiting the amplitude of all incoming pulses, said limiter circuit including an electron discharge tube having a control electrode, means for applying to said electrode the pulses to be shaped, and means for applying to said electrode the pulses from which selection is to be made, a resonant circuit tuned to a frequency having a period equal to twice that of the desired pulse width, arranged in the anode circuit of said tube and adapted to be shock-excited by each of said pulses into oscillations, means for substantially damping out portions of said oscillations, and means for selecting the undulations of greater amplitude produced by the oscillations of said resonant circuit.

11. A wave energy pulse shaper for translating pulses of a given width to pulses of a different desired width, comprising a resonant circuit tuned to a frequency having a period equal substantially to twice the period of said desired pulse width, means for applying pulses of said given width to said circuit for exciting said circuit into oscillations, each half cycle of an oscillation having a duration equal to the desired pulse width, and means for delivering at least portions of selected half cycles of said oscillations as output.

12. A wave energy pulse shaper for translating pulses of a given width into any one of a plurality of pulses of lesser width, comprising a resonant circuit tunable to a frequency having a period equal substantially to twice the duration of a desired one of said lesser pulse widths, means for applying said pulses of given width to said circuit to excite said circuit into oscillations, means for damping out substantially all but a given first half cycle of each oscillation, and means for delivering at least a portion of said half cycle of oscillation as output.

13. In a system for shaping wave energy pulses to a desired width and selecting from wave energy pulses of different widths those pulses of said desired width, a resonant circuit tuned to a frequency having a period equal to twice that of the desired pulse width, first means for applying the pulses to be shaped to said circuit, second means for applying to said circuit the pulses from which selection is to be made, control means for determining which of said first and second means is rendered operative, said circuit being excited into oscillation by the applied pulses and producing undulations varying in amplitude, those undulations produced by pulses of the desired width having the greater amplitude, and a fixed level threshold clipper adapted to accept only those undulations having said greater amplitude.

DONALD D. GRIEG.

REFERENCES CITED

The following references are of record in the file of this patent:

UNITED STATES PATENTS

| Number | Name | Date |
|---|---|---|
| 1,372,425 | Hammond, Jr. | Mar. 22, 1921 |
| 2,024,138 | Armstrong | Dec. 17, 1935 |
| 2,045,224 | Gerhard | June 23, 1936 |
| 2,061,734 | Kell | Nov. 24, 1936 |
| 2,089,639 | Bedford | Aug. 10, 1937 |
| 2,153,202 | Nichols | Apr. 4, 1939 |
| 2,181,309 | Andrieu | Nov. 28, 1939 |
| 2,211,942 | White | Aug. 20, 1940 |
| 2,217,957 | Lewis | Oct. 15, 1940 |
| 2,227,052 | White | Dec. 31, 1940 |
| 2,266,401 | Reeves | Dec. 16, 1941 |
| 2,359,447 | Seeley | Oct. 3, 1944 |
| 2,402,606 | Davis | June 25, 1946 |

FOREIGN PATENTS

| Number | Country | Date |
|---|---|---|
| 118,054 | Australia | Feb. 3, 1944 |
| 554,456 | Great Britain | July 5, 1943 |